Aug. 19, 1952   M. S. ABEL   2,607,342
SYRINGE
Filed Nov. 24, 1950

INVENTOR.
MARTIN S. ABEL
BY
Attorney

Patented Aug. 19, 1952

2,607,342

UNITED STATES PATENT OFFICE 2,607,342

SYRINGE

Martin S. Abel, Walnut Creek, Calif.

Application November 24, 1950, Serial No. 197,239

8 Claims. (Cl. 128—218)

My invention relates to syringes for handling, measuring and administering fluids. While the basic principles are widely applicable to fluid-handling devices of this broad classification, the invention is being initially embodied in a hypodermic syringe with outstanding advantages and will be so described for the purposes of the present disclosure.

With reference to the syringe as a finished article, an important object of my invention is to provide a precision hypodermic syringe that has a long service life and has certain advantages in use with special emphasis on free plunger action and easy cleaning.

A common cause of breakage in the use of medical syringes is the sticking of the usual glass plunger in the glass barrel caused by materials adhering to the plunger. In spite of careful cleaning, a glass plunger tends to accumulate a residual coating as it is exposed to different substances over a period of time, and such a coating makes the plunger stick both by increasing its diameter and by forming an adhesive bond between the plunger and barrel, especially when the plunger is inadvertently left in the barrel for even a short period of time.

I have discovered that this difficulty and cause of breakage can be eliminated by using a plunger having a surface provided by a fluorinated polymer, more particularly a surface of polymerized tetrafluoroethylene resin. I have found that a surface of this particular resin co-acting with a glass surface has such an unexpectedly low coefficient of sliding friction that it may aptly be called a self-lubricating plunger.

Such free plunger action requires, of course, a clean plunger surface and would be destroyed by any such residual coating as is commonly found on glass plungers. Tetrafluoroethylene resin, however, resists the formation of any coating whatsoever since it has zero water absorption and is, in effect, non-wettable. Most fluids commonly used in hypodermic syringes are actually repelled by this synthetic resin and nothing sticks to it with any appreciable strength. Hence, there is no cleaning problem.

Tetrafluoroethylene resin is also peculiarly suitable for use as a plunger for handling a wide range of fluids because it is practically inert chemically and can withstand high temperatures. It is especially suitable for medical use for these reasons and because it can be fabricated with precision and can be sterilized in the same manner as glass.

With reference to the method of making such devices, a simple inexpensive fabrication procedure is contemplated that is suitable for the economical mass production of precision hypodermic syringes and the like. In this regard, I have in mind not only eliminating the usual grinding operations in the manufacture of such medical syringes but also manufacturing the parts with sufficiently close dimensional tolerances as to make the barrels and plungers freely interchangeable. Such precision also makes it possible to use simply applied prefabricated volumetric scales on the barrels and thus avoid the usual expensive methods of forming such scales directly on the barrel surfaces.

Other objects and advantages of my invention will be apparent in the following detailed description taken with the accompanying drawings.

In the drawings, which are to be regarded as merely illustrative,

Figure 1:
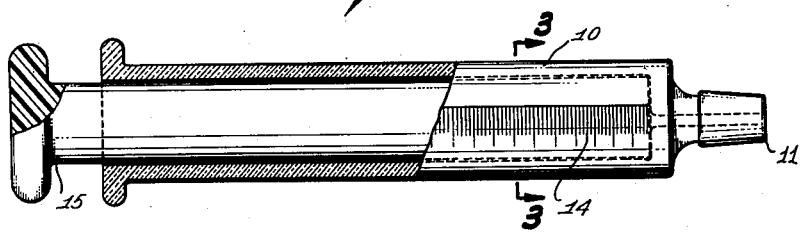
Fig. 1 is a view partly in section and partly in elevation of a syringe constructed in accord with the invention.

The syringe shown in Fig. 1 has a barrel 10 fabricated from a suitable type of glass, for example a glass known by the trade name Pyrex, and formed with the usual tip 11 to receive hypodermic needles. The bore of the barrel is dimensioned with precision and is uniform in diameter throughout its length.

The usual volumetric scale 14 may be etched on the glass of the barrel or formed thereon in any other suitable manner, but a feature of the preferred practice of my invention is the use of a high temperature decalcomania or a silk screen stencil for this purpose. Such a scale is inexpensive and has the advantage of providing a smooth surface that is easily cleaned.

The plunger 15 of the syringe has a surface of tetrafluoroethylene resin which is a halogenated polymer such as disclosed in the Plunkett Patent No. 2,230,654 issued February 4, 1941. This resin which is available under the trade name Teflon may be easily machined or molded precisely to predetermined dimensions and therefore the plunger may be made entirely of the resin to give the desired resin surface.

Figure 2:
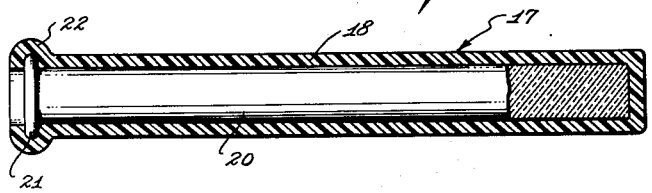
Fig. 2 is a sectional view of a modified form of plunger incorporating a glass reinforcement.
Figure 3:
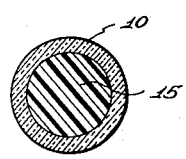
Fig. 3 is a sectional view taken as indicated by the line 3—3 of Fig. 1.

In some instances, especially in syringes of the larger sizes, it may be desirable to employ a synthetic resin plunger that is suitably reinforced internally for strength and rigidity. Fig. 2 by way of example shows a plunger generally designated 17 comprising a shell 18 of tetrafluoroethylene resin encasing a suitable core or reinforcement 20 which may be made of any suitable substance. This particular reinforcement 20 shown in the drawing is made of glass and is formed with a suitable head or flange 21 that is embedded in or gripped by the head or outer end portion 22 of the shell 18. The synthetic resin shell 18 protects the glass reinforcement 20 against breakage and it will be noted that while the outer end of the glass reinforcement is exposed in this particular embodiment of the invention, the exposed glass is set inward from the end of the resin shell for protection against shock.

In the preferred practice of my invention, it is contemplated that the barrels and plungers for the syringes will be manufactured to predetermined dimensions with such close tolerances as to make the parts interchangeable. Such a procedure is in contrast to the prevailing production methods in which the co-acting parts are individually ground to fit together and the barrels and plungers must be numbered in pairs for identification to make sure that a plunger is used only with its own particular matched barrel.

The fabrication procedure involves the use of suitable lengths of so-called precision bore glass tubing of the desired diameter. This tubing is made by a well known process of shrinking glass tubing on an accurately ground metal mandrel of uniform diameter for its entire length. The precision bore tubing thereby produced has an inner diameter of an extremely high degree of uniformity throughout. Such tubing is readily available commercially in a wide variety of sizes. In making my syringe barrels, the required tipped ends are "tooled" or shaped on the ends of lengths of precision bore tubing in the manner now commonly in use.

Since this procedure may be relied on to produce syringe barrels of predetermined uniform internal diameter, I may use predetermined volumetric scales for the barrels. The scale 14 in Fig. 1 may, for example, be prepared in advance in the form of high temperature decalcomania transfer or silk screen stencil and applied to the barrel after fabrication has been completed. The barrel is then put into an oven for annealing to relieve the strains left in the glass by the fabrication process, and at the same time the scale is thermally fixed in character.

Since the described fabrication procedure makes it possible to control the internal diameter of the barrel 17 as well as the diameter of the plunger 15 within close tolerances, even as close as approximately one ten-thousandth of an inch, the barrels and plungers may be manufactured in quantity to fit interchangeably. In sterilizing a number of such syringes, it is not necessary to match the barrels and plungers in individual pairs after the sterilization process, and when the barrel of one syringe and the plunger of another syringe are damaged or broken the remaining plunger and barrel may be assembled together as a syringe so that the net loss by breakage is only one syringe instead of two.

My specific disclosure of a preferred practice of the invention by way of example will provide adequate guidance for other specific practices of the invention and will suggest to those skilled in the art various changes and substitutions within the spirit and scope of my appended claims.

Having described my invention, I claim:

1. A syringe of the character described having in combination a glass barrel and a plunger, the entire length of the plunger having a continuous smooth surface of resinous fluorinated polymer.

2. A syringe of the character described having in combination a glass barrel and a plunger, the entire length of the plunger having a continuous smooth surface of polymerized tetrafluoroethylene resin.

3. A syringe of the character described having in combination a glass barrel and a one-piece plunger made entirely of polymerized tetrafluoroethylene resin.

4. A syringe of the character described having in combination a glass barrel, a plunger comprising polymerized tetrafluoroethylene resin, and a reinforcement embedded in the plunger, the resin covering the reinforcement throughout the length of the plunger.

5. A syringe as set forth in claim 4 in which said reinforcement is an elongated body of glass.

6. A syringe of the character described having in combination a glass barrel, a high temperature decalcomania on the surface of the barrel providing a volumetric scale and a plunger having a working portion at least equal to the inside length of the barrel for sliding movement in the barrel, said plunger having a continuous surface of polymerized tetrafluoroethylene resin throughout the length of its working portion.

7. A syringe of the character described having in combination a glass barrel with a volumetric scale overlying the surface thereof and a plunger with a working portion at least equal in length to the inside length of the barrel, said working portion having a continuous surface of polymerized tetrafluoroethylene resin throughout its length.

8. A syringe of the character described having in combination a glass barrel, a plunger comprising polymerized tetrafluoroethylene resin, and a glass rod embedded in the resin with the outer end of the glass rod exposed but spaced inward from the outer end of the enveloping resin.

MARTIN S. ABEL.

REFERENCES CITED

The following references are of record in the file of this patent:

FOREIGN PATENTS

| Number | Country | Date |
| --- | --- | --- |
| 3,520 | Great Britain | Mar. 5, 1890 |